United States Patent

Hartig

[15] 3,664,906
[45] May 23, 1970

[54] STRUCTURAL PANEL OF RIBBED STRUCTURES OF THERMOPLASTIC RESIN

[72] Inventor: Martval J. Hartig, Wilmington, Del.

[73] Assignee: E. I. du Pont de Nemours and Company, Wilmington, Del.

[22] Filed: Jan. 26, 1970

[21] Appl. No.: 10,697

[52] U.S. Cl. ................................. 161/68, 52/615, 161/123, 161/139
[51] Int. Cl. ............................................. B32b 3/12
[58] Field of Search ................ 161/41, 68, 69, 121, 123, 127, 161/139; 52/615

[56] References Cited

UNITED STATES PATENTS

| | | | |
|---|---|---|---|
| 2,071,921 | 2/1937 | Dickson | 161/165 X |
| 2,831,688 | 4/1958 | Knox | 272/66 |
| 3,043,730 | 7/1962 | Adie | 161/68 X |
| 3,141,913 | 7/1964 | Edwards | 264/210 |
| 3,235,439 | 2/1966 | Schultheiss | 161/69 |
| 3,369,821 | 2/1968 | Weber | 161/41 X |

*Primary Examiner*—John T. Goolkasian
*Assistant Examiner*—Henry F. Epstein
*Attorney*—Edwin Tucker

[57] ABSTRACT

Molten thermoplastic resin, e.g., polyethylene, is forced into a pattern on the surface of a rotating roll to form a web of ribs usually integrally molded to a continuous film; this web is of low density and has a high strength-to-weight ratio so as to be used for structural purposes and packaging.

3 Claims, 22 Drawing Figures

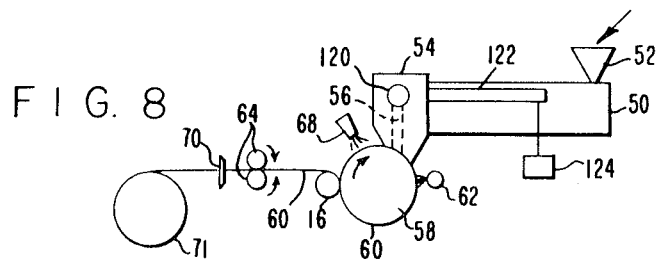
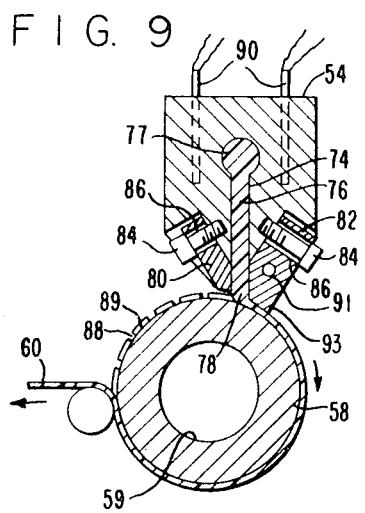
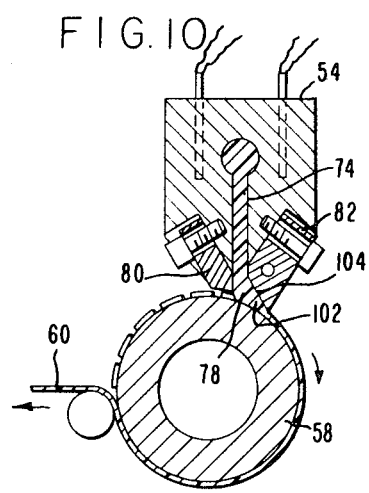
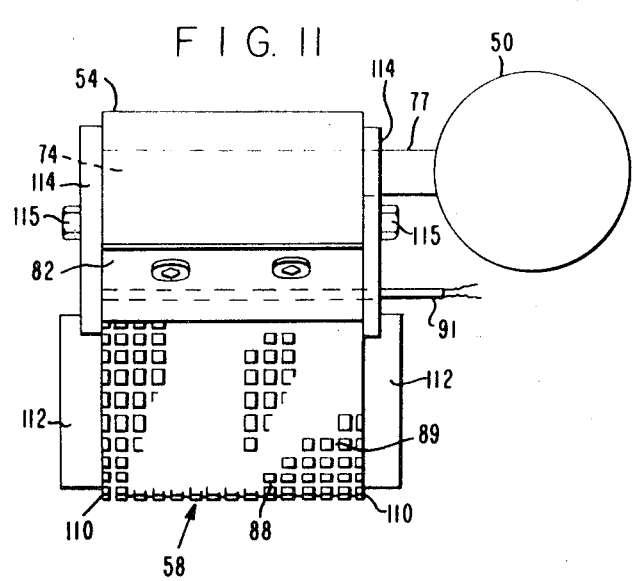
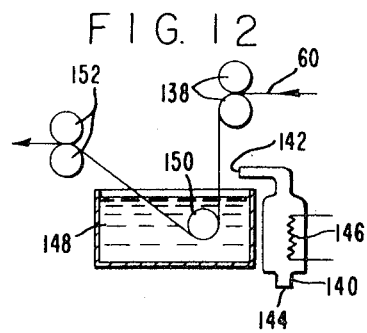

Patented May 23, 1972

STRUCTURAL PANEL OF RIBBED STRUCTURES OF THERMOPLASTIC RESIN

This application is a continuation-in-part of copending application Ser. No. 552,183, filed May 23, 1966, now abandoned by the same inventor and a divisional application of Ser. No. 619,995 filed Mar. 2, 1967, now U.S. Pat. No. 3,509,005 by the same inventor. This invention relates to ribbed structures of thermoplastic resin.

Heretofore, boxboard, paperboard and fiberboard have been the packaging materials predominantly used to make boxes. Plastics have better properties such as weatherability and inertness than these paper-based packaging materials but have not been used because of the relatively high cost of plastics in the shapes heretofore available for use in packaging.

The present invention provides light-weight and relatively rigid structures of thermoplastic resin which can be used economically in place of paper-based packaging materials and in other applications. These structures comprise a film and, either in parallel or in network form, ribs integrally molded to a surface of the film, in which the bulk density of the structure is less than 30 percent of the density of the resin and the bulk density of the ribs considered apart from the film is less than 20 percent of the density of the resin. In other words, most of the bulk volume of ribbed structures of this invention consists of air.

The low bulk densities of the ribs and overall ribbed structure of this invention are obtained by employing thin films, from 0.001 to 0.025 inch, but generally between 0.001 and 0.005 inch, and thin ribs generally spaced apart a distance which is from 20 to 50 times the thickness of the film. High flexural rigidity of the ribbed structure containing the network of ribs is obtained by the integral molding of the structure, rib spacing, and by having high height-to-width ratios for the rib cross-section, i.e., generally at least about 5:1.

The ribbed structures of this invention are made by passing pressurized molten thermoplastic resin substantially free of pressure drop along a laterally confined path which terminates in an outlet which is in pressure-seal relation with a relatively cool surface which is moving across the outlet and has a pattern therein which is complementary to that of the ribs, whereby the molten resin is forced into the pattern and fills it to form the ribs, restricting the flow space for the molten resin above the filled pattern to a size corresponding to the film thickness desired to thereby mold the film integrally with the ribs in the pattern, cooling the resultant ribbed structure, and removing the cooled ribbed structure from the moving surface at a point which is remote from the outlet.

In another embodiment of this invention, the film of the ribbed structure is removed to obtain a low bulk density network of ribs. Containers of ribbed structure form still another embodiment of this invention.

These and other embodiments of the present invention will be more fully discussed hereinafter with reference to the accompanying drawings in which:

FIG. 8 shows, diagrammatically, apparatus for making ribbed structure of the present invention;

FIG. 9 shows, in cross-section, one embodiment of molding apparatus for use in the apparatus of FIG. 8;

FIG. 10 shows, in cross-section, another embodiment of apparatus for use in the apparatus of FIG. 8;

FIG. 11 shows an embodiment for laterally confining molten thermoplastic resin;

FIG. 12 shows, diagrammatically, apparatus for defilming ribbed structure of this invention;

Figure 1:
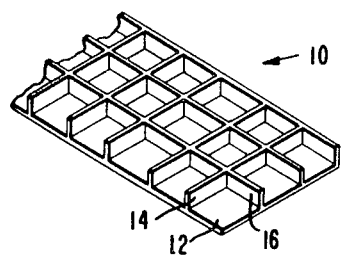
FIG. 1 shows in perspective a view of one embodiment of ribbed structure of the present invention.

Referring now to the drawings, FIG. 1 shows a sheet of ribbed structure 10 of the present invention consisting of a continuous film 12 forming the lower surface of the structure and molded integrally and coextensive therewith a network of ribs, i.e., consisting of ribs 14 and 16 intersecting with one another to form a pattern of squares between the ribs. The intersections of the ribs 14 and 16 are integrally molded. Integrally molded means molded as a unit from contiguous (contacting) masses of molten thermoplastic resin rather than molded into shapes from separate masses of molten resin which are then brought together and heat bonded.

The spacing between ribs and the film thickness of ribbed structures of this invention are generally coordinated to avoid buckling of the film when compressed by flexure of the ribbed structure. Generally, the ribs are spaced as far apart as possible to obtain low bulk densities yet while avoiding film buckling. Bulk densities for the network of ribs and for the ribbed structure can be less than 12 and 20 percent, respectively, of the density of the resin from which the structure is made. Representative dimensions for ribbed structures which can be made by the process to be described hereinafter, are as follows, all dimensions being in inches:

| Width of Ribs | Height of Ribs | Spacing between Ribs | Film Thickness |
|---|---|---|---|
| 0.004 | 0.025 | 0.073 | 0.0017 |
| 0.005 | 0.038 | 0.107 | 0.0025 |
| 0.006 | 0.056 | 0.150 | 0.0035 |
| 0.007 | 0.072 | 0.170 | 0.0040 |

Figure 2:
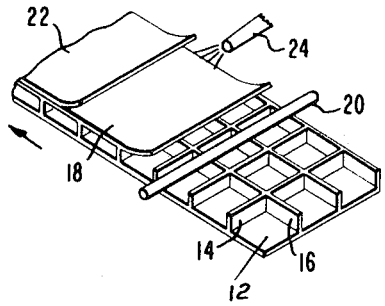
FIG. 2 shows an embodiment of a laminate using the ribbed structure of FIG. 1.

Ribbed structures of the present invention can be laminated to webs of other materials. For example, FIG. 2 shows the lamination of a film 18 of thermoplastic resin to the tops of the ribs 14 and 16 immediately after heat softening the film and the tops of the ribs, moving in the direction indicated, with a heat source such as burner 20. Such a laminate generally has a bulk density less than 35 percent of the resin(s) with which it is made. Optionally, another web of material 22, made of plastic, metal, cloth, wood or paper can be laminated to the ribs or the exterior of either film 12 or film 18, as shown, after application of a suitable adhesive, if necessary, for example, by sprayer 24. A particularly advantageous combination for packaging is the ribbed structure of FIG. 1, optionally with a film 18 laminated to the tops of the ribs, with metal foil, e.g., aluminum, laminated to one surface of the ribbed structure and paper laminated to the opposite surface of the ribbed structure, and optionally, metal foil laminated to the exposed surface of the paper. Pressure can be applied after each of the laminating steps to strengthen the bond between laminae, such as by passing the resultant laminate composed of ribbed structure and layer(s) of web material between the nip of a pair of rotating rolls spaced apart slightly less than the thickness of the laminate. In place of the burner 20, a freshly extruded film of thermoplastic resin can be laminated to the tops of ribs 14 and 16 by the application of pressure alone.

Figure 3:
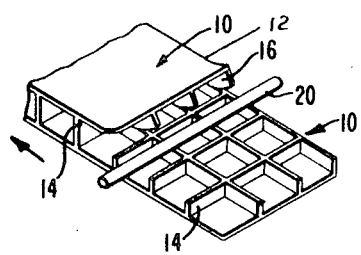
FIG. 3 shows another embodiment of a laminate using the ribbed structure of FIG. 1.

The stiffness-to-weight ratio of ribbed structures of this invention can also be improved by laminating them together film-to-film, rib-to-film, or rib-to-rib, the latter in the manner of and to form the structure shows in FIG. 3.

The ribs of ribbed structure of this invention are uniplanar and can be interconnected to form a network of many different patterns of polygonal shapes, such as rectangles, triangles, or hexagons, or of curvilinear shapes, such as circles, instead of the pattern of squares shown in FIG. 1.

The ribbed structures of this invention can be used in place of paper-based materials in many applications such as signs for outdoor use and as packaging materials substantially in the same manner as paper-based packaging materials. Thus, the ribbed structures can be folded, into a box shape and held together with its own flaps, optionally assisted by glue or staples. Laminates of ribbed structures of this invention have even greater stiffness and can be used in the same way as the ribbed structures and also in ways made possible by the particular character of the web materials laminated to the ribbed structure.

Figure 4:
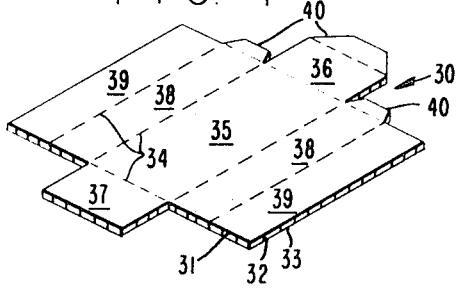
FIG. 4 shows a carton blank of ribbed structure of this invention.

FIG. 4 shows a carton blank 30 of a ribbed structure of this invention, the structure consisting of film 31, a network of ribs 32 integrally molded therewith and a foldable web of material, such as film 33 of thermoplastic resin laminated to ribs 32. The blank 30 is scored along dashed lines 34 in the manner of a fiberboard to a back-wall 35 having a top 36 and bottom 37 extending therefrom, and a pair of side-walls 38 having portions 39 of a front-wall extending therefrom. The top 36 and side-walls 38 also have tuck-in flaps 40 extending therefrom. Surprisingly, the ribbed structure of the present invention, whether it be without film 33 or with this film as shown in FIG. 4, can be scored and folded sharply along the score lines, such as lines 34 to yield a set-up carton which is still strong and having a long-lasting hinge such as between back-wall 35 and top 36.

Figure 5:
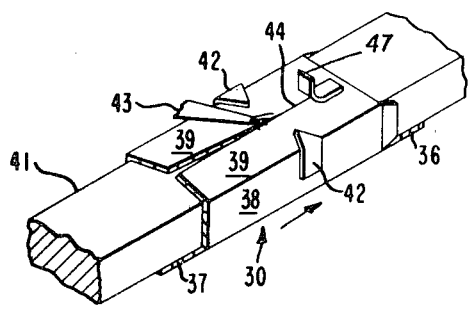
FIG. 5 shows the partial setting-up of the carton of FIG. 4.

FIG. 5 shows the partial setting-up of the carton blank 30 by folding along its longitudinal score lines 34 around an elongated anvil 41 having the shape of the interior of the finished box to be made from the blank and by passing the folded blank along the anvil in the direction shown so as to pass between fingers 42 which force the front-wall portions 39 together in abutting relationship. Just prior to abutting, a source of heat such as burner 43, melts the edges of portions 39, whereby when these edges do come together, they become heat-bonded or welded to one another to form a seam 44.

Figure 7:
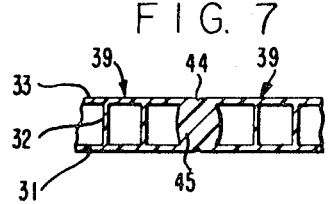
FIG. 7 shows a cross-section of a welded seam in ribbed structure of this invention.

Often for labeling or appearance reasons, a weld seam which bulges from the surface of the pieces being welded is objectionable. The carton of the present invention avoids this disadvantage by the ability of the ribbed structure to swallow the weld seam. As shown in FIG. 5, immediately after the seam 44 is formed, it passes beneath a pressure finger 47, which by forcing the seam 44 against anvil 41 confines the thickness of the seam to the thickness of the ribbed structure. The result, as shown in FIG. 7, is that the weld bead 45 of the seam, which holds the portions together, is forced into the interior of the ribbed structure. Means (not shown) are provided for holding the seam 44 together until it has cooled sufficiently to retain its own integrity. The abutting edges of ribbed structure can be either perpendicular to the surface of the structure or can be cut at complementary, acute and obtuse angles, or so that the films 12 and 18 form a slight overlap. The size of the weld bead 45 at the resultant seam will depend on the amount of melting of the resin.

The anvil 41 can have a cross-section which diminishes in size so that the abutting edges of front-wall portions 39 are maintained apart during edge melting and are allowed to come together immediately thereafter. The function of fingers 42 and pressure finger 47 can be accomplished by a sleeve (not shown) closely fitted over the anvil 41.

Figure 6:
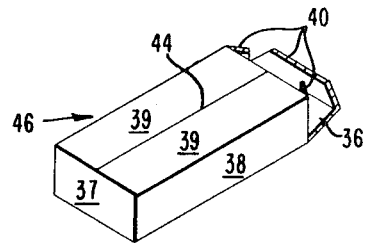
FIG. 6 shows the set-up carton blank of FIG. 4.

FIG. 6 shows the set-up carton blank of FIG. 4 to form a carton 46 in which the seam 44 extends the length of the front portions 39 and in which the bottom 37 has been similarly heat bonded to the side-walls 38 and front-wall portions 39. Instead of a localized heat source, such as burner 43 being used to heat bond the bottom 37 to other walls, a heat source (not shown) supplying heat simultaneously to all of the edges to be heat-bonded can be used. The use of heat-bonding of abutting edges to form cartons of this invention provides a savings in material used as compared with the customary practice of sealing between overlapping edges.

Containers other than cartons or boxes can be made with ribbed structures of the present invention. For example, a sheet of ribbed structure can be formed around an anvil having an annular cross-section, and longitudinally seamed to form tubing which can be heat-sealed at the ends with correspondingly shaped caps to form cans. Alternately, the sheet of ribbed structure can be spirally wound and seamed about an anvil. Open-topped containers, such as berry boxes can also be made from ribbed structures of this invention. The ribbed structures of the present invention impart good thermal insulation to containers as well as other articles made therewith. Ribbed structures of this invention are thus useful for making such packages as ice cream cartons.

The ribs and films of ribbed structures of this invention define closed cells which can be filled prior to closing with various media for given purposes. For example, the cells may be filled with inert gas for insulation purpose or granular solids for the same purpose or for fire retardency. Such solids, e.g., sand, form a low cost filler which adds to the stiffness of the ribbed structure. The cells may be filled with liquids for decorative purposes. The cells can be used as a metering device for its contents in that such contents can be discharged or removed one cell at a time.

Apparatus for continuously molding ribbed structures of the present invention is shown spray FIG. 8. In this FIG., an extruder 50 is equipped with a hopper 52 for receiving thermoplastic resin and melting it under pressure. A die 54 receives the pressurized molten resin through its rear (hidden) side from the extruder and passes the resin along a path 56 which terminates in an outlet in pressure-seal relation with a rotating patterned roll 58 and directs the resin substantially free of pressure drop and in the absence of air into the pattern of the roll. The roll 58 continuously moves the molten resin away from the outlet of path 56, thereby forming a continuous molded web 60 having a pattern which is complementary to that of the roll. The web 60 is chilled by a flume or water spray 62, and after sufficient contact with the roll 58 which is internally cooled, the cooled web is removed from the roll by take-off rolls 64 aided by a stripper roll 16 and, optionally, mold release agent applied by spray nozzles 68 to the surface of the roll prior to passage under die 54. Longitudinal dividing or trimming of web 60 is accomplished, if desired, by one or more blades 70 positioned between the take-off rolls 64 and reel 71.

To further describe the die 54 and patterned roll 58, which comprise the molding apparatus, FIG. 9 shows one embodiment in which die 54 contains a cavity 74 serving as path 56 (FIG. 8) and which is supplied with molten thermoplastic resin 76 through inlet pipe 77 by extruder 50. Cavity 74 terminates in a slot-shaped outlet 78 extending across the surface of roll 58. The rearward and forward edges of outlet 78 are defined by a die plate 80 and a doctor blade 82, each adjustably spaced from roll 58 and secured to die 54 by bolts 84 extending through slots 86. The pressure upon the molten resin 76 in the cavity forces the resin through outlet 78 and into the roll pattern represented by transverse grooves 88 (enlarged in spacing and width for clarity) and circumferential intersecting grooves 89. The cavity 74 and outlet 78 are substantially free of constriction so that the pressure on the resin at the surface of roll 58 is substantially the same as the pressure on the resin in cavity 74.

The grooves 88 and 89 mold one surface of the web 60. The opposite surface of the web is formed by doctor blade 82 which is adjustably spaced from roll 58 to give the web thickness desired. Die 54 is heated to a temperature above the resin melting temperature of the particular resin being used, by electrical heating elements 90 extending into corresponding walls in the die. The resin melting temperature is the minimum temperature at which a fresh sample of resin leaves a molten trail as it is moved slowly across a heated metal surface. This is also sometimes called the stick temperature.

Doctor blade 82 is heated by an electrical heating element 91 usually to a temperature which is equal to or greater than the temperature maintained by die 54. The outer face 93 of the doctor blade departs sharply from the path of web 60 so as to avoid sticking of the web to the hot doctor blade. Roll 58 is at a temperature which is at least about 10°C. less than the melting temperature of the resin being molded, such as by passing a cooling medium through an interior passage 59.

In FIG. 10 essentially the same equipment arrangement as in FIG. 9 is used except that slot-shaped outlet 78 includes a wedge-shaped passage 102 extending in the direction of rotation of roll 58. The wedge-shape of the passage 102 is formed by doctor blade 82 having a slant surface 104 facing the roll 58. Movement of the surface of roll 58 past the opening 78 drags molten resin into the passage 102 wherein the flowing resin is forced into the pattern on roll 58. This drag flow pressure created in the passage 102 at the surface of the roll augments the pressure on the resin within cavity 74 of the die.

The molding apparatus of FIGS. 9 and 10 can be provided with water spray 62 and mold release spray nozzles 68 as shown in FIG. 8.

A pressure-seal relation between the outlet 78 for the molten thermoplastic resin and roll 58 is maintained so that the pressure on the resin in cavity 74 and the drag flow pressure, when the apparatus of FIG. 10 is employed, are available to force the resin into the pattern of roll 58 on a continuous and high speed of production basis. Generally, the resin in cavity 74 is under a pressure of at least 50 psig. for resins that have fluid melts, such as polyamides, while for the more viscous resin, such as polyethylene, the pressure is generally above 175 psig. There is a capability, however, of using much higher molding pressures, such as in excess of 1,000 psig. depending on the pattern being molded. The pressure-seal relation is obtained, in part, by adjusting the doctor blade 82 to constrict the flow space for the resin as it leaves outlet 78 and by having a sufficient rate of web formation for the viscosity of the particular resin being molded to prevent back flow under the die plate 80 which is generally spaced 2 to 10 mils from the surface of roll 58.

FIG. 11 shows means for laterally confining the molten thermoplastic resin as it leaves opening 78 so as to complete the pressure-seal relation. In FIG. 11, the doctor blade 82 is shown in operative position and provided with heating element 91. The lateral surface of the roll 58 is provided with a pattern consisting of continuous transverse grooves 88 and continuous circumferential grooves 89, terminating at shoulders 110 formed between the surface of the roll and cylindrical ends 112 of reduced diameter extending from each end of the roll. The molten resin from cavity 74 is molded into a web which extends entirely across the grooved pattern. Further sideways flow of the resin, however, is prevented by a pair of end plates 114 adjustably spaced from roll 58 by bolts 115 passing through slots (not shown) in the end plates and tightened into die 54. The end plates 114 each lie close to the shoulders 110 and have a lower arcuate surface lying close to the corresponding surface of cylindrical ends 112. This close spacing, on the order of several mils, permits a small amount of molten resin to enter the tortuous path around shoulders 110 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 114 and roll 58. The end plates 114 also form the lateral sides for cavity 74 and the die outlet 78 which is coextensive therewith.

Means can also be provided for changing the spacing between the die 54 and the roll 58 to compensate for pressure fluctuations caused by extruder 50 so as to maintain a constant force on the resin entering the roll pattern. Exemplary of such means is the pivotal mounting of die 54 about a stub shaft 120, which is on center with the feed line between extruder 50 and the die, and providing a lever arm 122 having the desired weight 124 suspended therefrom as shown in FIG. 4. Excessive molding pressure is relieved by the die 54 rotating away from roll 58. Upon return of the pressure to normal, weight 124 restores the die 54 to its former position to produce web of the desired thickness.

To fill rib patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 78 in the direction of rotation of roll 58 greater than at least one repeat unit in the pattern.

In operation, the roll 58 is rotated and molten thermoplastic resin is forced into the pattern of the roll. Molten resin which is contiguous with the surface of the roll and molten resin within the rib pattern is formed into a film by doctor blade 82. The resin is cooled and removed from the roll as a continuous, patterned web, with the rib pattern being complementary to that of the pattern in the roll 58 and consisting of a plurality of longitudinally extending ribs corresponding to grooves 89 and transversely extending ribs corresponding to grooves 88. The ribs and film are all integrally molded to one another and the ribs are at right angles with the film. The geometry of the grooves 88 and 89 will, of course, control the configuration of the ribs in the final ribbed structure.

Figure 13:
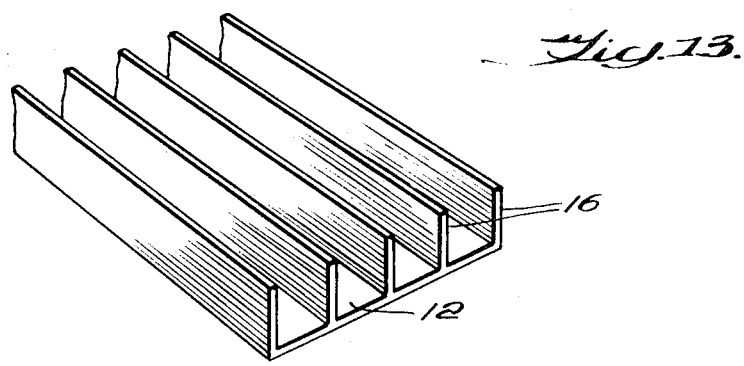
FIG. 13 shows in perspective a view of another embodiment of ribbed structure of the present invention.
Figure 14:
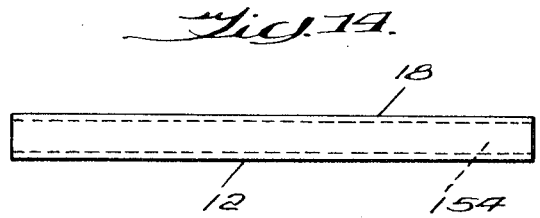
FIG. 14 shows a side elevation of another embodiment of the ribbed structure of FIG. 13.
Figure 15:
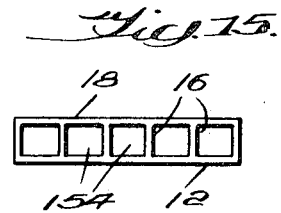
FIG. 15 shows a front view of the embodiment of FIG. 14.
Figure 16:
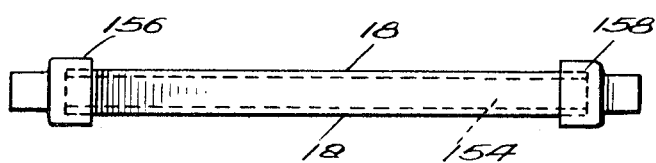
FIG. 16 shows a side elevation of one embodiment of heat exchanger incorporating the ribbed structure of FIG. 14.
Figure 17:
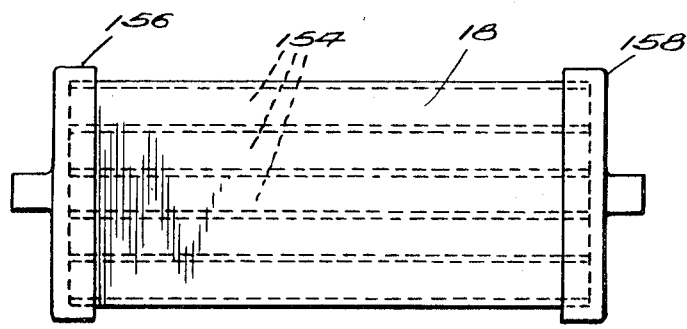
FIG. 17 shows a plan view of the heat exchanger of FIG. 16.

The grooves 88 can be omitted from the roll, in which case the ribbed structure will consist of a film 12 and parallel ribs 16, as shown in FIG. 13, integrally molded to the film. Bulk densities os this ribbed structure can also be less than 30 percent of the density of the resin from which the structure is made. A film, such as film 18, can be laminated to the tops of the ribs, such as in the manner described with respect to FIG. 2, to form a plurality of channels 154 between the films 12 and 18 and ribs 16 as shown in FIGS. 14 and 15. The resultant structure is useful as a heat exchanger such as by coupling with inlet and outlet manifolds 156 and 158, as shown in FIGS. 16 and 17. In other embodiments, the heat exchanger in the sheet form of FIGS. 14 and 15 or overlapped upon itself such as by rolling, folding or stacking, can be appropriately manifolded so that either every other channel or layer of sheet serves to convey a cooled medium while the remaining channels serve to convey a heated medium, for heat exchange between them.

In either embodiment of ribbed structure, the spacing of the doctor blade 82 from the surface of roll 58 determines the thickness of the film 12 in the ribbed structure. In still another embodiment of ribbed structure, the doctor blade can be held in contact with the roll surface whereby no film 12 is formed and the resultant product is a network of integrally molded ribs corresponding to ribs 14 and 16 of FIG. 1. To make such a product, however, it is generally more convenient to space the doctor blade 82 slightly from the roll surface, e.g., 0.001 to 0.003 inch, whereby a film 12 of like thickness if formed.

For the embodiment of FIG. 1, this film can be removed by heating the web sufficiently to melt the film, which results in the film retreating or drawing-back into the network of ribs. The heating should be insufficient to melt or otherwise damage the resultant network of ribs. Thermoplastic resin, particularly polyamides, tend to degrade when heated in the presence of oxygen at temperatures required for melting the film. Degradation can be avoided, however, by carrying out the heating very quickly and thereafter immediately quenching the defilmed web, or by excluding oxygen.

FIG. 12 shows apparatus for carrying out this defilming on the web 60. The web 60 is passed through the nip of feed rolls 138 and downwardly in front of outlet 142 of a heater 140. The heater 140 receives air through inlet 144 and heats it to 700°–800°C. by means of heating element 146, shown diagrammatically. The defilmed web is immediately quenched in water bath 148 at tap temperature as the web travels around guide roll 150 positioned therein and then through take-off rolls 152. The defilmed web 60 is then a network of ribs such as ribs 14 and 16 shown in FIG. 1, except that no film 12 is present. This network of ribs can be laminated to webs such as shown in FIG. 2 for the purpose of forming honeycomb-like structures for acoustical or structural applications.

Details illustrating the manufacture of a web such as web 70 are as follows:

EXAMPLE I

The patterned roll is 4 inches in diameter and has a pattern 6 inches wide consisting of grooves 0.010 inch wide × 0.050 inch deep running parallel to and perpendicular to the direction of rotation of the roll to form squares measuring about ⅛ inch on a side. The roll is maintained at a temperature of about 80°C. and is rotated at a surface speed of about 20 ft./min. Linear polyethylene is forced at 275°C. and at a pressure of about 250 psig. into the pattern of the roll from a pivotally mounted die having its outlet 78 and doctor blade 82 maintained about 0.004 inch from the roll during operation by a 162 lb. weight acting through a 30 inch lever arm. No mold release agent is used. The resultant web consists of continuous film measuring about 0.004 inch in thickness and having integrally molded ribs arranged in a square pattern ⅛ inch on a side, the ribs measuring 0.010 inch wide × 0.050 inch deep.

EXAMPLE II

A laminate is made from the web formed as just described by extruding a 0.004 inch linear polyethylene film from a film die at 275°C. onto a chill roll operating at 88°C. and forming a 0.056 inch nip with another roll and simultaneously passing the film and web, rib-side towards the film, through the nip to thereby force the film against the ribs of the web to form a laminate containing a core of upstanding ribs.

EXAMPLE III

A ribbed structure is made in the same equipment but from 66 nylon instead of polyethylene, by operating the patterned roll at 150°C. and a molding temperature of 270°C. and pressure of 100 psig.

EXAMPLE IV

Ribbed structure having parallel ribs only (no intersecting ribs) is produced from polyethylene in the same manner and on the same equipment as described for example I except that the grooves running perpendicular to the direction of rotation of the roll are eliminated. The procedure of example II is followed to form a heat exchange structure from the resultant ribbed structure. The heat exchange structure is then glued at its ends within inlet and outlet manifolds to form a plate-like heat exchanger.

Figure 18:
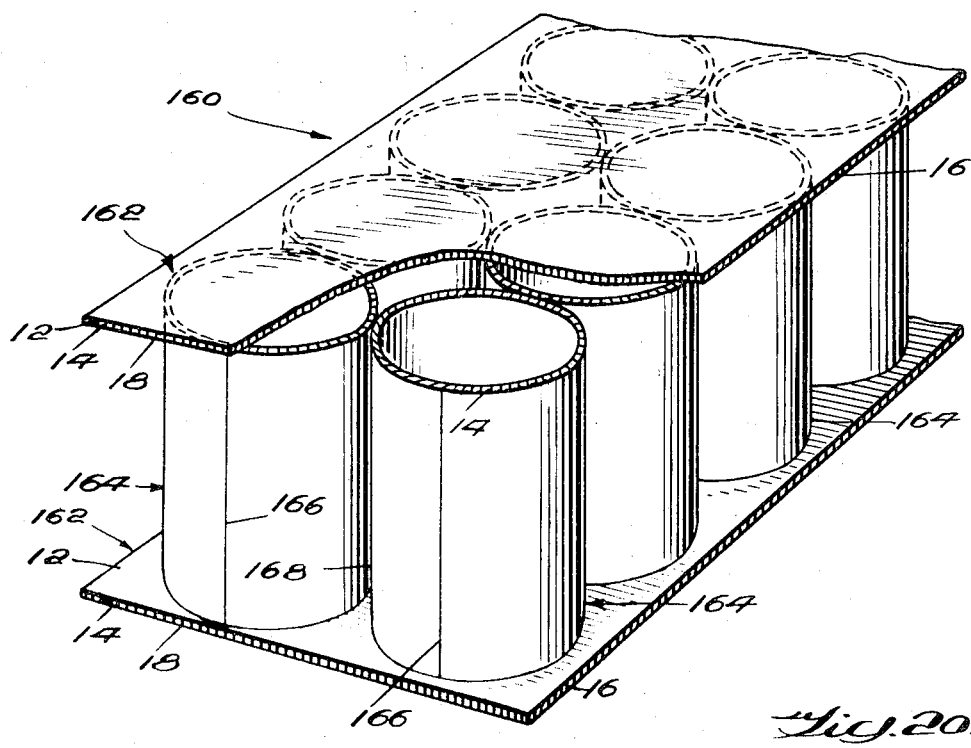
FIG. 18 shows in perspective a partially cut-away structural panel incorporating features of this invention.

Ribbed structures of the present invention can be used to form strong, light-weight, structural panels. An example of such a panel is shown in FIG. 18, in which the panel 160 consists of a pair of coextensive, spaced, substantially parallel surface members, in this case boards 162, secured, e.g., by gluing or in other ways, along their opposed inner surfaces to the ends of a plurality of upstanding members, generally in tubular form and in this FIG. being cylinders 164 arranged in a plurality of contiguous rows. The boards 162 are each made of the ribbed structure of FIG. 2, consisting of films 12 and 18 and ribs 14 and 16. The cylinders 164 are made of the same ribbed structure which has been conformed around an anvil of corresponding shape and butt welded to form a seam 166.

Figure 19:
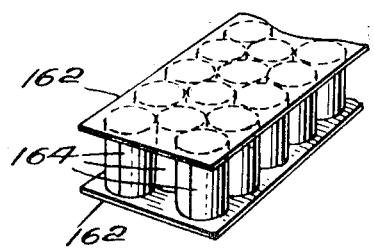
FIG. 19 shows schematically in perspective another embodiment of the panel of FIG. 18.
Figure 20:
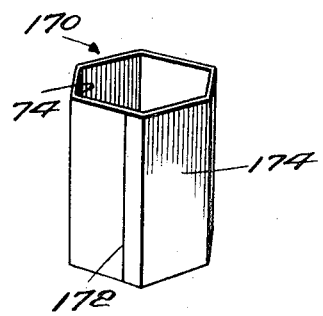
FIG. 20 shows in perspective another embodiment of tubular shape for use in structural panels of this invention.
Figure 21:
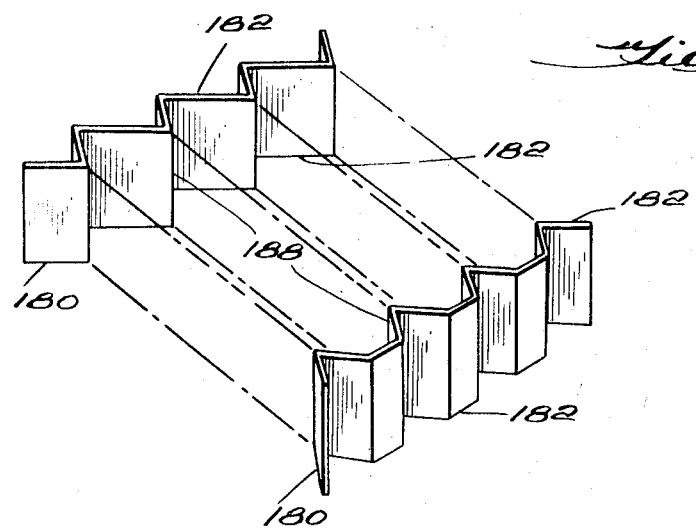
FIG. 21 shows a pre-assembled view of another embodiment of tubular members for use in structural panels of this invention.
Figure 22:
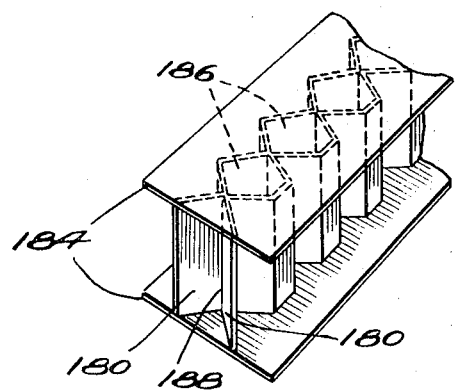
FIG. 22 shows schematically a panel formed with the tubular members of FIG. 21 as the core.

Structural panels made from ribbed structure of this invention, such as panel 160, are capable of withstanding high loads in the direction perpendicular to the boards and are therefore useful, e.g., as ceiling and floor panels. The strength of the panel can be varied by the choice of ribbed structure for its various components and by the diameter, location and spacing of the tubular members. The ribbed structure of FIGS. 1 and 3 can be used. An especially advantageous arrangement of tubular members is shown schematically in FIG. 19 in which the cylinders 164 are arranged in contiguous staggered rows between the boards 162. The tubular members 164 can be glued to one another along the surfaces contacting one another, such as along line 168 shown in FIG. 18. The cylinder 164 can also have a tubular cross-section of different annular shape such as the hexagonal shape of tube 170 shown in FIG. 20, which is formed by bending ribbed structure about a hexagonal anvil and butt welding to form seam 172. The flat faces 174 of tube 170 provide greater area for contacting and gluing to adjacent tubes. The tubular members need not be formed as such prior to securement between surface boards, but instead can be formed in situ from a plurality of corrugated sheets of ribbed structure arranged in opposing fashion. For example, zig-zag sheets 180 (FIG. 21) of ribbed structure are brought together and glued along their edges 182 to surface members 184 to form tubular cells 186 therebetween (FIG. 22). The sheets 180 have different folded shapes to illustrate some of the different corrugations possible. The sheets 180 can be glued to one another along lines 188 of contact with one another. This gluing can be done in advance of sandwiching between surface members so as to form a honeycomb structure, and in the case of thermoplastics, the gluing can take the form of welding by localized melting of sheets 180 along lines 188. Alternatively, the sheets 180 may be adjacent but separated from one another so as to form channels instead of cells. In another embodiment, unfolded sheets 180 can be slotted and interconnected egg-crate fashion to form rectangular cells.

The surface members or boards 162 of panels of this invention can be surfaced with another material desired depending on the application intended. The film 18 of the ribbed structure of which the surface and tubular members are made can be of such material, such as any of the webs of material 22 named hereinbefore, and the films 12 and 18 can also be surfaced with any of these materials as desired. Likewise, the surface members need not be made from ribbed structure but can be made of the webs of material 22, in which case the tubular members, arranged such as in FIGS. 18, 19, 20 and 21, of ribbed structure serve as a strong, light-weight honeycomb core for these webs. When the tubular member and the inner surface of the surface member are thermoplastic, they can be secured to one another using a heat source such as burner 20 in the manner shown in FIG. 2.

The thermoplastic resins which are useful in the present invention are any of which are extrudable into continuous solid shapes from a heated, molten condition and under relatively high pressures. Examples of suitable thermoplastic resins include polystyrene, high impact polystyrene, ABS resin, the saturated hydrocarbon polymers, such as linear or branched polyethylene, polypropylene and copolymers thereof; ionomers such as described in Canadian Pat. Nos. 674,595 and 713,631 both to R. W. Rees; copolymers of ethylene with an α,β-unsaturated carboxylic acid such as described in British Pat. No. 963,380 to Du Pont, and blends thereof with saturated hydrocarbon polymers and such blends containing co-crystallized oxide, water activated cross-linking agents such as described in U.S. Pat. application Ser. No. 248,229, filed Dec. 31, 1962 by Halliwell et al.; halogenated or perhalogenated olefins, such as vinyl chloride polymer and melt fabricable tetrafluoroethylene polymers such as copolymers thereof with hexafluoropropylene, and chlorotrifluoroethylene polymer; polyvinyl acetate and copolymers thereof with saturated hydrocarbon polymers and optionally, the acid copolymers of British Pat. No. 963,380 to Du Pont; polymers of α,β-unsaturated carboxylic acid, such as polymethylmethacrylate; the polyamides such as polyhexamethylene adipamide (66 nylon), polyhexamethylene sebacamide (610 nylon), polycaprolactam (6 nylon), copolymers thereof, and blends of the polyamides with acid copolymers, ionomers, and/or saturated hydrocarbon polymers; polyoxymethylene polymer and copolymer; polycarbonate; polyethylene terephthalate.

The particular molding temperatures employed in making ribbed structures of the present invention will depend upon the resin being molded and upon such operating conditions as the speed of the patterned roll 58 and the intricacy of the pattern therein. Typical molding temperatures for some of the thermoplastic resins suitable for use in the present invention are as follows: linear polyethylene 200°–250°C.; branched polyethylene 180°–190°C.; polypropylene 200°–250°C.; polystyrene 240°–280°C.; polyvinyl chloride 150°–170°C.; and 66 nylon 260°–350°C.

The wedge-shaped passage 102 can be of any configuration which augments the molding pressure supplied by the extruder. Generally, the passage 102 will take the form of converging surfaces, with the roll pattern forming one of these surfaces. The pressures required on molten thermoplastic resin in cavity 74 can be less than the full extrusion pressure of the extruder, depending upon which resin is employed and upon operating conditions. The pressure in the cavity 74, however, is substantially the same as the pressure on the resin coming into contact with the pattern of the roll surface. When such pressure is insufficient, the drag flow arrangement of FIG. 6 can be used to increase the force present for continuously filling the pattern with molten resin.

As many apparently widely different embodiments of this invention may be made without departing from the spirit and scope thereof, it is to be understood that this invention is not limited to the specific embodiments thereof except as defined in the appended claims.

What is claimed is:

1. A structural panel comprising a pair of spaced substantially parallel board members and a plurality of upstanding members secured at their ends to the opposing inner surfaces of said board members, each of said board members and said upstanding members being made of ribbed structure of thermoplastic resin, comprising a 0.001 to 0.025 inch thick film and a network of ribs integrally molded to a surface thereof and with one another, said ribbed structure having a bulk density of less than 30 percent of the density of said resin, said network of ribs having a bulk density of less than 20 percent of the density of said resin, and a web of material laminated to the tops of said ribs, the cross-sectional height-to-width ratio of said ribs being at least 5:1.

2. In a structural panel having a honeycomb core, said core comprising a plurality of upstanding members made of ribbed structure of thermoplastic resin, comprising a 0.001 to 0.025 inch thick film and a network of ribs integrally molded to a surface thereof and with one another, said ribbed structure having a bulk density of less than 30 percent of the density of said resin, said network of ribs having a bulk density of less than 20 percent of the density of said resin, and a web of material laminated to the tops of said ribs, the cross-sectional height-to-width ratio of said ribs being at least 5:1.

3. In the structural panel of claim 2 wherein said upstanding members are tubular.

* * * * *